US007853929B2

(12) United States Patent
Klein

(10) Patent No.: US 7,853,929 B2
(45) Date of Patent: Dec. 14, 2010

(54) DYNAMICALLY PROFILING CONSUMPTION OF CPU TIME IN JAVA METHODS WITH RESPECT TO METHOD LINE NUMBERS WHILE EXECUTING IN A JAVA VIRTUAL MACHINE

(75) Inventor: Paul Fredric Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 11/305,569

(22) Filed: Dec. 16, 2005

(65) Prior Publication Data

US 2007/0168996 A1 Jul. 19, 2007

(51) Int. Cl.
*G06F 9/45* (2006.01)
(52) U.S. Cl. ...................................... 717/129
(58) Field of Classification Search ................. 717/149, 717/129
See application file for complete search history.

(56) References Cited

U.S. PATENT DOCUMENTS

| | | | | |
|---|---|---|---|---|
| 6,263,361 | B1 | 7/2001 | Hoyer et al. | 709/203 |
| 6,493,868 | B1* | 12/2002 | DaSilva et al. | 717/105 |
| 7,293,259 | B1* | 11/2007 | Dmitriev | 717/130 |
| 7,653,899 | B1* | 1/2010 | Lindahl et al. | 717/128 |
| 2003/0196061 | A1 | 10/2003 | Kawahara et al. | 711/170 |
| 2004/0054984 | A1 | 3/2004 | Chong et al. | 717/103 |
| 2004/0139186 | A1 | 7/2004 | Lee et al. | 709/223 |
| 2005/0015356 | A1 | 1/2005 | Ireland et al. | 707/1 |
| 2005/0066314 | A1* | 3/2005 | Bates et al. | 717/129 |
| 2008/0134149 | A1* | 6/2008 | Bates et al. | 717/129 |

FOREIGN PATENT DOCUMENTS

JP 2003-140928 5/2003

OTHER PUBLICATIONS

"Controlled server side execution environment," Research Disclosure Jan. 2000, n429148, p. 184.
"Performance monitoring infrastructure (PMI) in WebSphere," Research Disclosure Dec. 2001, n452166, p. 2148.
El-Kharashi, M.W.; Pfrimmer, J.; Li, K.F.; Gebali, F; "A design space analysis of Java Processors", Communications, Computers and Signal Processing, 2003, PACRIM. 2003 IEEE Pacific Rim Conference on, vol. 1, Aug. 28-30, 2003, pp. 159-163.

(Continued)

*Primary Examiner*—John Chavis
(74) *Attorney, Agent, or Firm*—Justin M. Dillon; Janet M. Skafar

(57) ABSTRACT

Various embodiments of a computer-implemented method, system and computer program product monitor the performance of a program component executing in a virtual machine. Breakpoints associated with position indicators within the program component are set. In response to reaching one of the breakpoints, an amount of time consumed between the breakpoint and a previous breakpoint is determined. The amount of time associated with the position indicators is accumulated. The amount of time is associated with a position indicator that is associated with the previous breakpoint.

20 Claims, 12 Drawing Sheets

OTHER PUBLICATIONS

Grzegorz Czajkowski, Thorsten von Eicken, "JRes: a resource accounting interface for Java", Conference on Object Oriented Programming Systems Languages and Applications archive, Proceedings of the 13the ACM SIGPLAN conference on Object-oriented programming, systems, languages, and applications, pp. 21-35, Year of publication, 1998.

S. Liang and D. Viswanathan, "Comprehensive Profiling Support in the Java Virtual Machine", USENIX Conference on Object-Oriented Technologies (COOTS), May 1999, pp. 229-240.

JVM™ Tool Interface, Version 1.0.38, [online]Last Updated Apr. 11, 2010 [retrieved on Oct. 6, 2005]Retrieved from the Internet: <URL: http://java.sun.com/j2se/1.5.0/docs/guide/jvmti/jvmti.html>. 200 pages.

User's Guide, Omegamon® XE for DB2, Version 100, [online]Sep. 2002 [retrieved on Oct. 27, 2005]Retrieved from the Internet: <URL: http://publib.boulder.ibm.com/tividd/td/ITOMEGAXEfDB2/GC-32-9297-00.pdf>, pp. 1-58.

* cited by examiner

20 line number | Java statement
24 | 22

```
401    private boolean handleNewConnection()
402    {
403            String moduleName = "Control.handleNewConnection";
404
405            InputStream instream = null;
406            Boolean retCode = true;
407            int rLen
408            int aIdx;
409            byte aBuff[] = new byte[100];
410
411            if (tool.isShutDown())
412            return false;
413    try
414    {
415            instream = newSocket.getInStream();
416    }
417    catch(IOException ioe)
418    {
419            message.put(errorMessage1, ioe.getErrorMessage());
420            return false;
421    }
422    //Have the input stream
423    do
424    {
425            try
426            {
427                    rLen = in.read(aBuff, 0, aBuff.length);
428            }
429            catch(IOException ioe)
430            {
431                    message.put(errorMessage1, ioe.getErrorMessage());
432                    retCode false;
433                    break;
434            }
435    }
436    }
437    public int hello ()
438    {
439            String outString = "Hello World";
440            message.put(outmsg1, outString);
441            return 1;
442    }
```

Prior art

| 122 | 124 | 126 | 128 | 130 |
|---|---|---|---|---|
| Last class name | Last method name | Last line number | Last bytecode position | Last callback invocation system time |

| 142 | 144 | 146 | 148 | 150 | 152 |
|---|---|---|---|---|---|
| Class name | Method name | Line number | Accumulated CPU time | Count | Accumulated system time |

| 162 | 164 | 166 | 168 | 170 | 172 |
|---|---|---|---|---|---|
| testClass | testMethod | 2 | 1 | 1 | 1 |
| testClass | testMethod | 4 | 2 | 4 | 5 |
| testClass | testMethod | 6 | 1 | 4 | 2 |
| testClass | testMethod | 8 | 3 | 7 | 3 |
| testClass | testMethod | 10 | 2 | 10 | 4 |
| testClass | testMethod | 12 |  | 1 |  |

| 182 | 184 | 186 | 188 | 190 | 192 | 194 |
|---|---|---|---|---|---|---|
| Class name | Method name | Line number | Bytecode position | Accumulated CPU time | Count | Accumulated system time |

| Java Source Line Number | CPU Seconds Consumed | Times Line Invoked | CPU% Method | CPU% Total | Clock Seconds Consumed | Impact Index | Java Statement or Byte Code at Line |
|---|---|---|---|---|---|---|---|
| 151 | 0.000 | 29 | 0.00< | 0.00< | 0.000 | 0 | recordType = recType; |
| 152 | 0.000 | 9 | 0.00< | 0.00< | 0.000 | 0 | Record = rec; |
| 154 | 0.000 | 29 | 0.00< | 0.00< | 0.000 | 0 | StringTokenizer tokenizer = new StringTokenizer(rec, "^"); |
| 155 | 0.000 | 29 | 0.00< | 0.00< | 0.000 | 0 | alertState = null; |
| 156 | 0.000 | 29 | 0.00< | 0.00< | 0.000 | 0 | String modName = "AlertAgent.getRecordInfo"; |
| 159 | 0.000 | 29 | 0.00< | 0.00< | 0.000 | 0 | for (int tIdx = 0; tokenizer.moreTokens(); tIdx++) |
| 162 | 0.031 | 1,856 | 0.31 | 0.01 | 0.000 | 0 | if (tIdx >= Interface.ALERT_ARRAY_SIZE); |
| 164 | 0.000 | 29 | 0.00 | 0.00 | 0.000 | 0 | Util.putText(mName + "too many alerts"); |
| 165 | 0.000 | 0 | 0.00 | 0.00 | 0.000 | 0 | break; |
| 168 | 9.531 | 1,856 | 96.06 | 4.24 | 0.009 | 100 | alertData.add(tokenizer.nextToken(), tIdx); |
| 159 | 0.343 | 1,856 | 3.46 | 0.15 | 0.000 | 3 | for (int tIdx = 0; tokenizer.moreTokens(); tIdx++) |

DYNAMICALLY PROFILING CONSUMPTION OF CPU TIME IN JAVA METHODS WITH RESPECT TO METHOD LINE NUMBERS WHILE EXECUTING IN A JAVA VIRTUAL MACHINE

BACKGROUND OF THE INVENTION 1.0 Field of the Invention

This invention relates to performance monitoring; and in particular, this invention relates to dynamically profiling consumption of CPU time in Java methods with respect to method line numbers while executing in a Java virtual machine.

2.0 Description of the Related Art

A Java application program executes in a Java virtual machine on a computer system. The Java virtual machine (JVM) is a software machine which executes on the hardware of a physical machine, that is, a computer system. In other words, the JVM is a software simulation of a machine. The JVM takes as its program input a stream of bytes, referred to as bytecode, that represent execution code provided by a programming language, then simulates that program's execution one bytecode at a time. Programs that are written in a language that produces the bytecode used by the JVM are called Java application programs.

Because the JVM is a simulated machine, Java application programs may not perform as efficiently as computer programs executed in the machine language of the computer system. This is due in part to the simulation and also in part to the nature of the Java language itself. As a language, Java removes the programmer from knowing any details of the hardware of the machine on which the Java application program executes; therefore, when designing the Java application program, the programmer may not be able to take advantage of the computer system's hardware, and in particular, any special features of the computer system's hardware. Because of these factors, Java application programs tend to consume large amounts of processor time. Therefore, it would be desirable to measure the amount of processor time, also referred to as central processing unit (CPU) time, consumed by a Java application program and redesign that Java application program if that consumption is excessive.

FIG. 1 depicts a portion of an exemplary Java application program 20. The program logic of the Java application program 20 comprises one or more Java instructions or statements 22. Each line of a Java application program 20 is associated with a line number 24. One or more Java statements may be on, that is associated with, a line and line number. A Java statement produces one or more bytecodes. The program logic of a Java application program 20 comprises one or more classes and each class comprises one or more Java methods. In this example, an exemplary Java method called handleNewConnection starts on line 401, and another exemplary Java method called hello starts on line 437. A Java method is invoked using its name and is ended at a return, for example, on lines numbered 412, 420 and 421, or at a break for example on line 433.

Conventional performance monitors typically measure the performance of Java application programs at the Java method level. Typically the performance monitor will determine the amount of time that a Java method consumes by computing the difference in time between when a Java method is entered and when the Java method is exited or ended. In addition, a Java method can wait during its execution. Therefore, measuring the amount of time that a Java method consumes by computing the difference in time between when the Java method is entered and exited is good for calculating Java application program delays, but may not accurately measure the amount of processor time consumed, that is, central processing unit (CPU) time consumption.

Within a Java method, some Java statements may consume more CPU time than other Java statements. The technique described above does not measure the CPU time consumption within a Java method. Therefore, there is a need for a technique that measures CPU time consumption within the Java method.

SUMMARY OF THE INVENTION

To overcome the limitations in the prior art described above, and to overcome other limitations that will become apparent upon reading and understanding the present specification, various embodiments of a computer-implemented method, system and computer program product monitor the performance of a program component of an application program executing in a virtual machine. Breakpoints associated with position indicators within the program component are set. In response to reaching one of the breakpoints, an amount of time consumed between the breakpoint and a previous breakpoint is determined. The amount of time associated with the position indicators is accumulated. The amount of time is associated with a position indicator that is associated with the previous breakpoint. In some embodiments, the position indicator is a line number. In other embodiments, the position indicator comprises a bytecode position. In various embodiments, the amount of time is CPU time.

In this way, various embodiments are provided which measure the CPU time consumption within the Java method. Some embodiments measure the CPU time consumption associated with the line numbers of the Java method. Other embodiments measure the CPU time consumption associated with the bytecode positions of the Java method.

BRIEF DESCRIPTION OF THE DRAWINGS

The teachings of the present invention can be readily understood by considering the following description in conjunction with the accompanying drawings, in which:

FIG. 1 depicts a portion of an exemplary Java application program;

FIG. 5 depicts a diagram of an embodiment of a data structure used in various embodiments to determine performance data;

FIG. 6 depicts a diagram of an embodiment of a timing list which stores performance data;

FIG. 7 depicts an exemplary timing list which is storing illustrative performance data;

FIG. 8 depicts a diagram of another embodiment of a timing list which stores performance data;

FIG. 14 depicts a diagram of another embodiment of displaying performance data for various line numbers of a Java application program.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to monitor the performance of a Java method. Various embodiments of a computer-implemented method, system and computer program product monitor the performance of a program component of an application program executing in a virtual machine. Breakpoints associated with position indicators within the program component are set. In response to reaching one of the breakpoints, an amount of time consumed between the breakpoint and a previous breakpoint is determined. The amount of time associated with the position indicators is accumulated. The amount of time is associated with a position indicator that is associated with the previous breakpoint.

In various embodiments, the virtual machine is a JVM, the program component is a Java method, and the application program is a Java application program.

In some embodiments, the position indicator is a line number. In other embodiments, the position indicator comprises a bytecode location or position. In yet other embodiments, the position indicator is the bytecode location or position. In this description, a "bytecode location" is also referred to as a "bytecode position".

Figure 2:
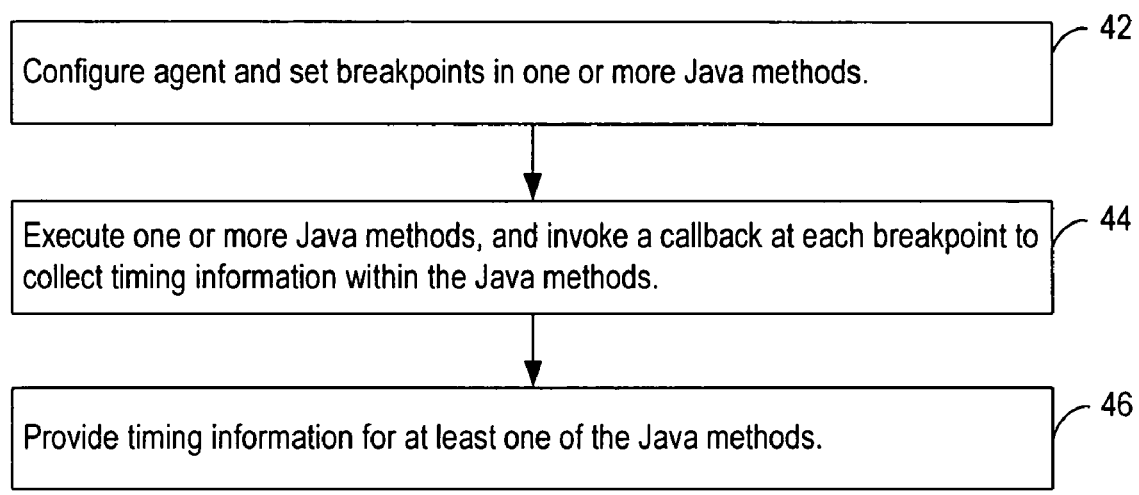
FIG. 2 depicts a high-level flowchart of an embodiment of the present invention.

FIG. 2 depicts a high-level flowchart of an embodiment of the present invention. In step 42, an agent is configured and breakpoints are set in one or more Java methods. A breakpoint is associated with a line or bytecode of a Java method. A breakpoint is also associated with a callback function. In response to reaching a line or bytecode associated with a breakpoint, the JVM invokes the associated callback function. In various embodiments, the agent is implemented as a Java Virtual Machine Tool Interface (JVMTI) agent which runs as a thread inside the JVMTI environment. In various embodiments, the JVMTI facility found in the Java 2 System Development Kit (SDK) 1.5 and above is used. The JVMTI comprises a set of interface calls which allow a caller to establish one or more callback functions. In some embodiments, more than one JVMTI environment can exist concurrently. The agent is discovered by the JVM because the agent resides in a special documented library, that is, in a predetermined location, and then gets loaded and executed by the JVM as part of the JVM's initialization.

In step 44, one or more Java methods are executed, and a callback is invoked at each breakpoint to collect timing information within the Java methods. In step 46, timing results are provided.

Figure 3A:
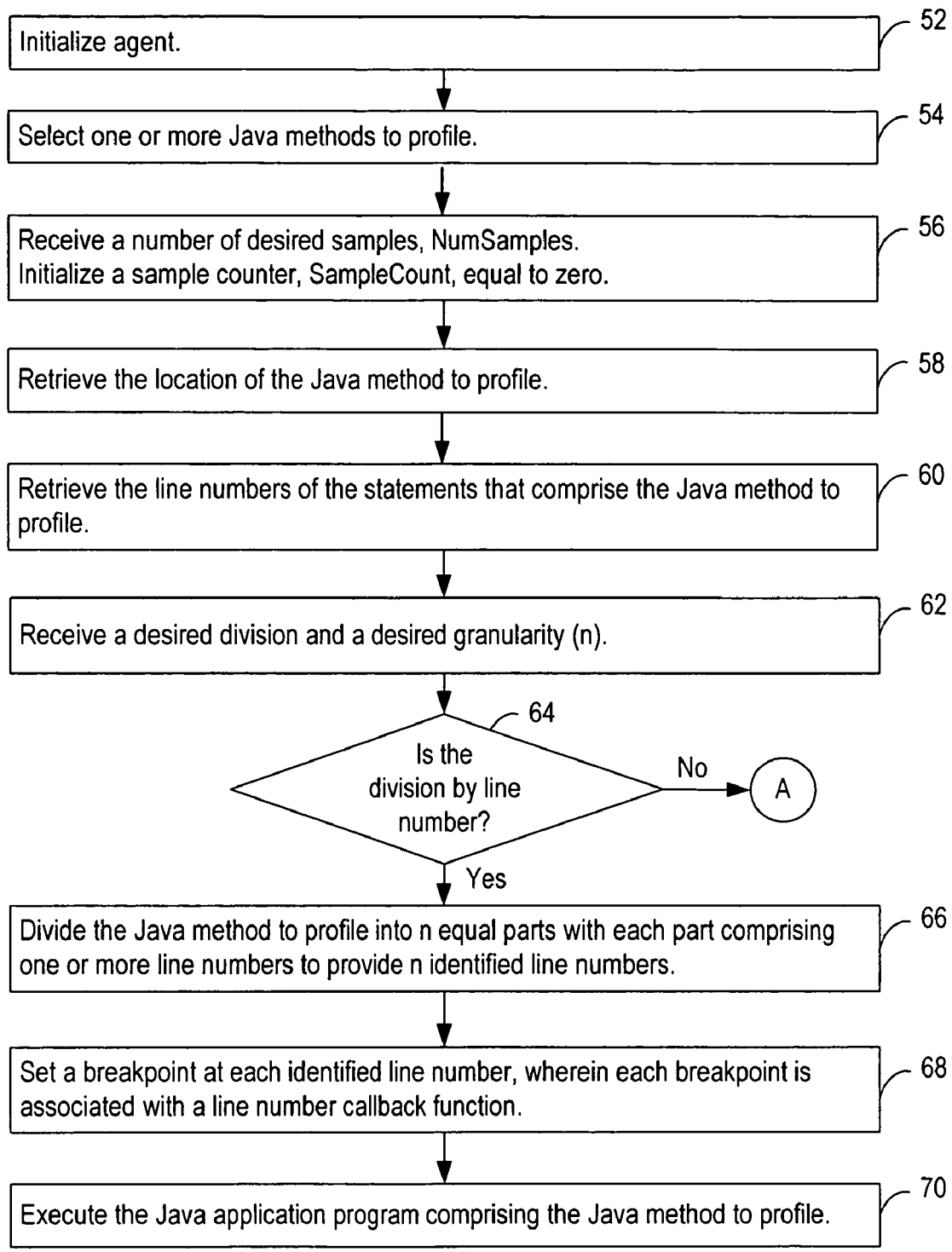
FIG. 3 comprises FIGS. 3A and 3B which collectively depict a flowchart of an embodiment of configuring an agent and setting breakpoints of FIG. 2.
Figure 3B:
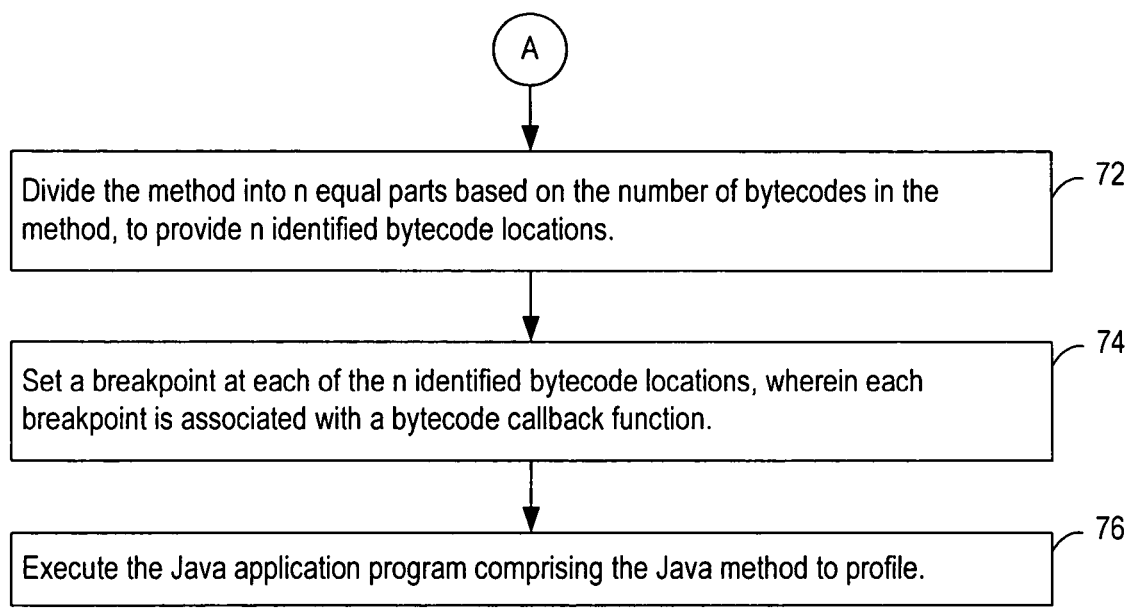

FIG. 3 comprises FIGS. 3A and 3B which collectively depict a flowchart of an embodiment of configuring an agent and setting breakpoints of FIG. 2. In step 52, the agent is initialized. As described above, the JVM discovers, loads, and executes the agent. In some embodiments, the agent determines whether the JVM supports various JVMTI interface functions used to monitor performance. In various embodiments, the agent invokes the GetPotentialCapabilities function to determine the functions the JVM currently supports. If the agent determines that the JVM does not support the functions used to monitor performance, the agent notifies the user, and the agent does not continue with execution.

In step 54, one or more Java methods to profile are selected. In some embodiments, the Java methods of a Java application program are identified and presented to the user in a list from which the user selects the Java methods to profile. Therefore, less than all of the Java methods of a Java application program may be selected. Alternately, all the Java methods of a Java application program are selected.

In step 56, a number of desired samples, NumSamples, is received, and a sample counter, SampleCount, is set equal to zero. In some embodiments, the number of samples is supplied by a user. Alternately, the number of samples is a predetermined value. In other embodiments, rather than a number of samples, an amount of time to collect performance data is received. In some embodiments, step 56 is omitted and a NumSamples is set to a predetermined value.

In step 58, the location of the Java method to profile is retrieved. In various embodiments, the agent invokes the JVMTI GetMethodLocation interface function which returns the starting address and the ending address of where the Java method to profile is loaded in the JVM. In various embodiments, using the GetMethodLocation interface function, the starting address is equal to zero, and the ending address is equal to the size of the Java method minus one. In some embodiments, the starting address is equal to zero, and the ending address is equal to the bytecode count of the Java method minus one. In various embodiments, the JVMTI GetMethodLocation function is also used to determine the size, in bytecodes, of the Java method.

In step 60, the line numbers of the statements that comprise the Java method to profile are retrieved. In some embodiments, the agent invokes the JVMTI GetLineNumberTable function which returns an array of line numbers, along with the location of their starting bytecode, that comprise the Java method.

In step 62, a desired division and a desired granularity (n) are received. In various embodiments, a user provides the desired division and granularity. Alternately, a default division and/or granularity may be used. The CPU time consumption will be measured based on the division and granularity. In some embodiments, the default division is by line number; in other embodiments, the default division is by bytecode. In various embodiments, step 62 is omitted and a default predetermined division and default predetermined granularity are used.

Step 64 determines whether the division is by line number. If so, in step 66, the Java method to profile is divided into "n" equal parts with each part being a line number to provide n identified line numbers. When dividing the Java method into "n" equal groups of line numbers, each $n^{th}$ line number will be a point of instrumentation at which CPU time consumption will be measured. In some embodiments, the last group of line numbers will have fewer line numbers than the other groups. In various embodiments, for each $n^{th}$ line number, the JVMTI GetLineNumberTable is used to find the bytecode location in that Java method which corresponds to the start of the statement at that line number.

In step 68, a breakpoint is set at each n'th line number, wherein each breakpoint is associated with a line number callback function. In various embodiments, the JVMTI Set- BreakPoint function is used to set breakpoints at the bytecode locations which correspond to the line number locations.

In step 70, the Java application program with the Java method is executed. During execution of the Java application program, in response to reaching a bytecode location or position for which a breakpoint is set and prior to executing the bytecode associated with that bytecode position, the JVM invokes the corresponding breakpoint callback function, that is, the line number callback function.

In response to step 64 determining that the division is not by line number, step 44 proceeds via Continuator A to step 72 of FIG. 3B. In step 72, the Java method is divided into n equal parts based on the number of bytecodes in the Java method, to provide n identified bytecode locations. The Java method is divided into "n" parts with each part comprising one or more bytecodes. The parts typically contain the same number of bytecodes, except that the last part may not contain the same number of bytecodes as the other parts. When dividing the Java method up into "n" equal bytecodes, each identified bytecode will be a point of instrumentation at which CPU time consumption will be measured. In various embodiments, by dividing the Java method into bytecodes, the performance at one or more bytecode locations associated with the same line number can be measured.

In step 74, a breakpoint is set at each of the n identified bytecode locations, wherein each breakpoint is associated with a bytecode callback function. In various embodiments, the JVMTI SetBreakPoint interface function is called for each bytecode location at which a breakpoint is to be set. Breakpoints allow a breakpoint event to be sent to a registered callback function each time that bytecode is executed.

In step 76, the Java application program comprising the Java method is executed. During execution, at least a portion of the bytecodes at which breakpoints are set may be executed.

A Java thread is a unit of operation in a JVM. The JVM may divide the program logic of the Java application program into portions which can be executed concurrently on separate threads. Therefore, the Java application program may be executed using one or more threads. The threads are independent and execute concurrently. To execute a Java method, the JVM associates that Java method with a thread and executes that Java method on that thread. Once the JVM starts executing the Java method on a thread, that Java method will execute on that same thread until the Java method exits or ends.

Figure 4:
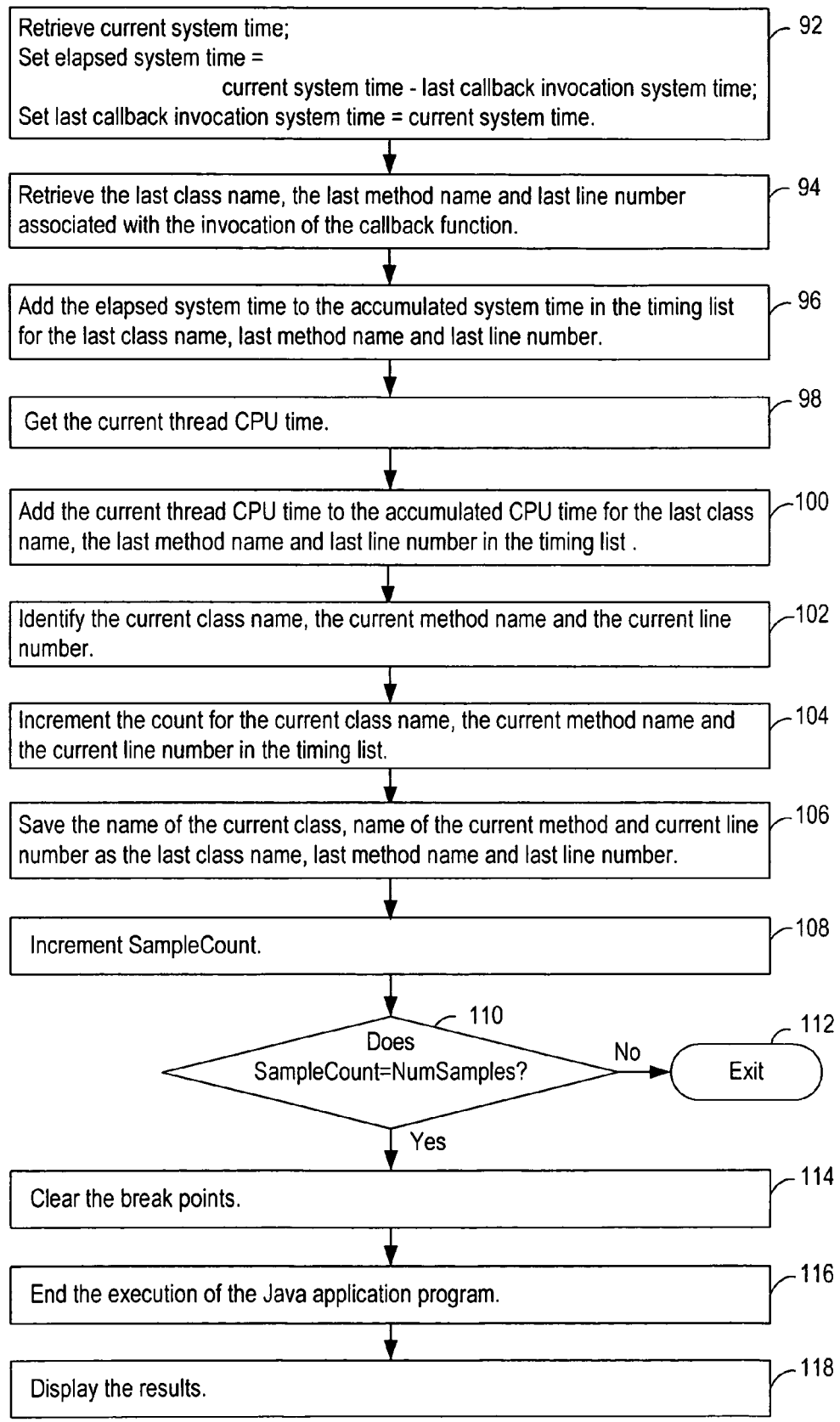
FIG. 4 depicts a flowchart of an embodiment of a callback function which is invoked at each breakpoint.

FIG. 4 depicts a flowchart of an embodiment of a callback function which is invoked at each breakpoint. In various embodiments, the flowchart of FIG. 4 is implemented in the line number callback function. In some embodiments, the line number callback function is passed the name of the Java method and the location of the bytecode that is reached, that is, the bytecode position for which the line number callback function is invoked.

In step 92, the current system time is retrieved; the elapsed system time is set equal to the current system time minus the last callback invocation system time; and the last callback invocation system time is set equal to the current system time. In various embodiments, an in-memory list, referred to as the timing list, is indexed by class name, method name, line number and bytecode location number. In various embodiments, the current system time is read from the system clock. The current system time may also be referred to as the wall clock time. The elapsed system time is the amount of system time that has elapsed since the time the last breakpoint occurred.

In step 94, the last class name, last method name and last line number associated with the invocation of the callback function are retrieved.

In step 96, the elapsed time is added to the accumulated system time in the timing list for the last class name, last method name and last line number.

In step 98, the current thread CPU time is retrieved. The current thread CPU time is the amount of CPU time consumed by the current thread since the previous callback invocation for the current thread. In various embodiments, at each invocation of the line number callback function, a call is made to the JVMTI GetCurrentThreadCPUTime function to determine how much CPU time that the current thread has consumed since the previous callback.

In step 100, the current thread CPU time is added to the accumulated CPU time in the timing list for the last class name, last method name and last line number. In this way, the thread CPU time consumption at the start of a current bytecode breakpoint event is considered to be incurred by the execution of one or more Java statements associated with and, in some embodiments, also following, the bytecode position associated with the previous bytecode breakpoint event and prior to the current bytecode breakpoint event.

In step 102, the current class name, the current method name and the current line number are identified. In various embodiments, the current method name is the name of the Java method provided when the callback function is invoked. In some embodiments, the line number is identified based on the bytecode location associated with the invocation of the callback function.

In step 104, the count for the last identified class name, last method name and last line number in the timing list is incremented by one.

In step 106, the current class name, current method name and current line number are saved as the last class name, last method name and last line number.

In step 108, the SampleCount is incremented by one. SampleCount is used to determine whether the desired number of samples are collected.

Step 110 determines whether SampleCount is equal to NumSamples, which may be specified by a user in FIG. 3A. If not, in step 112, the callback exits.

If SampleCount is equal to NumSamples, in step 114, the breakpoints are cleared. In various embodiments, the JVMTI ClearBreakPoint interface function is called for the same locations used on the SetBreakPoint function to remove the breakpoints. Removing breakpoints causes breakpoint events to no longer occur and the callback function associated with a removed breakpoint for a location will not be invoked when the JVM reaches that location.

In step 116, the execution of the Java application program is ended. In step 118, the results are displayed.

In some embodiments, an amount of elapsed time since the start of execution is used, rather than a SampleCount. In various embodiments, approximately one thousand samples are considered sufficient.

The result of this profile monitoring is an in-memory list, that is, the timing list, that forms a histogram of locations within the Java method whose associated statement(s) are executed, the amount of times executed, the total thread CPU time consumption, and in some embodiments, the total system time consumed, for these locations.

In some embodiments, a breakpoint is set for every line number of a Java method. In other embodiments, breakpoints are set for less than all the line numbers of a Java method. For example, breakpoints may be set for every other line number of a Java method; and, the accumulated CPU time and the accumulated system time for the line numbers in the timing list are associated with the execution of the Java statements of two lines.

FIG. 5 depicts a diagram of an embodiment of a data structure 120 used in various embodiments to determine performance data. The data structure 120, which is also referred to as a Last_CMLB_structure, comprises a last class name 122, last method name 124, last line number 126, last bytecode position 128, and last callback invocation system time 130. In various embodiments, the flowchart of FIG. 4 stores the last class name, last method name, last line number and last bytecode position in the data structure 120.

FIG. 6 depicts a diagram of an embodiment of a timing list 140 which stores performance data. In various embodiments, the callback function of FIG. 4 stores the performance data in the timing list 140. The timing list 140 comprises a class name 142, method name 144, line number 146, accumulated CPU time 148, count 150, and accumulated system time 152.

FIG. 7 depicts an exemplary timing list 160 which is storing illustrative performance data in accordance with the flowchart of FIG. 4. The timing list 160 stores information for a class named testClass 162 and a Java method named, testMethod 164. The Java method has twelve lines, and a breakpoint is set at every other line, in other words, n is set equal to 2. For line 2 of testMethod, Count 170 is equal to 1 because line 2 is executed once; the accumulated CPU time 168 is equal to 1, in this example, millisecond; and the accumulated system time is equal to one, in this example, millisecond. For line 4, Count is equal to 4 because line 4 is executed four times; the accumulated CPU time is equal to 2 milliseconds; and the accumulated system time is equal to 5 milliseconds.

FIG. 8 depicts a diagram of another embodiment of a timing list 180 which stores performance data. The timing list 180 comprises a class name 182, method name 184, line number 186, a bytecode position 188, an accumulated CPU time 190, a count 192 and an accumulated system time 194. In some embodiments, the timing list is indexed by class name, method name, line number and bytecode position.

Figure 9:
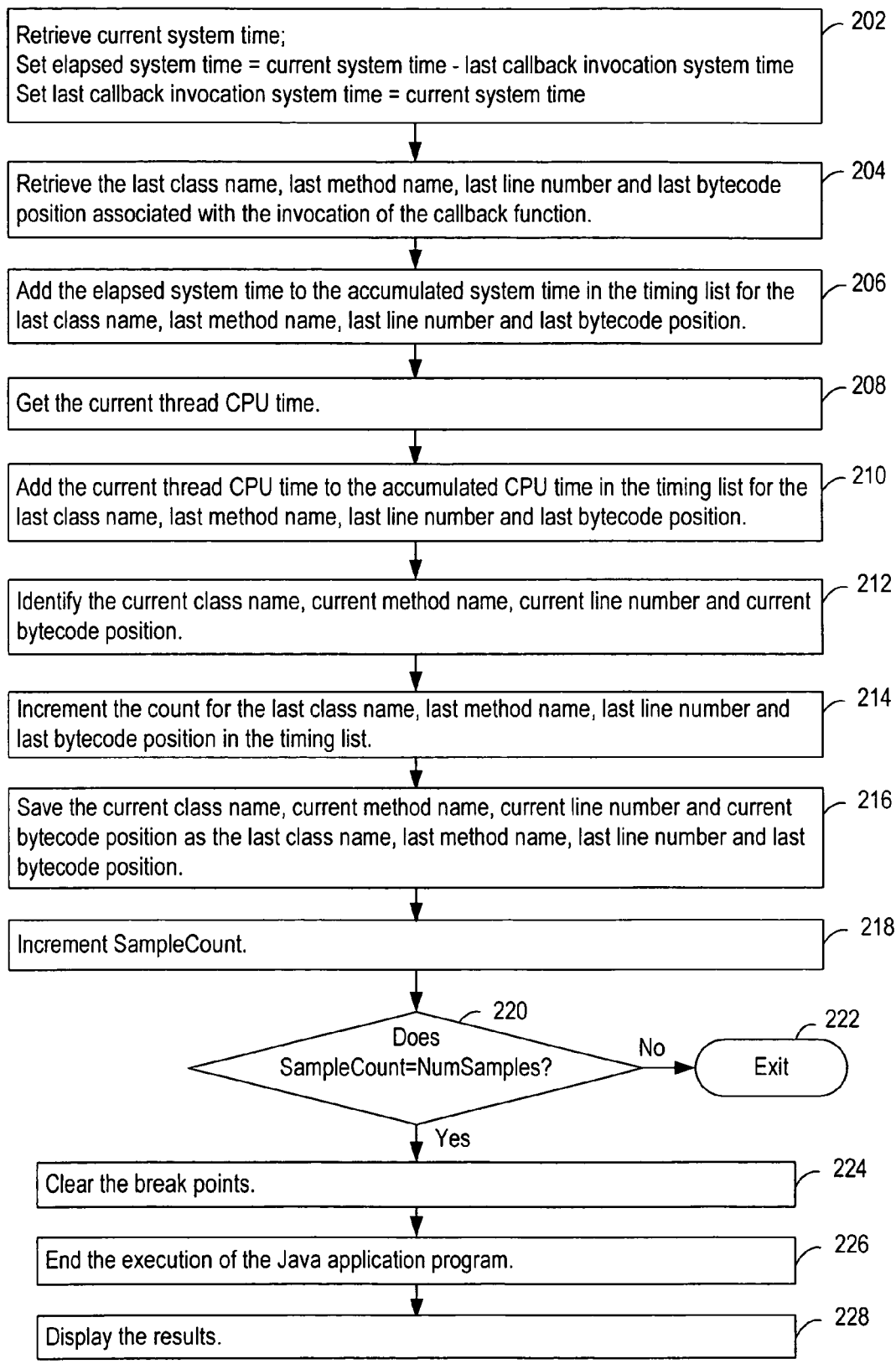
FIG. 9 depicts a flowchart of another embodiment of a callback function which is invoked at each breakpoint.

FIG. 9 depicts a flowchart of another embodiment of a callback function which is invoked at each breakpoint. In various embodiments, the flowchart of FIG. 9 is implemented in the bytecode callback function. In some embodiments, when invoked, the bytecode callback function is passed the name of the Java method and the location of the bytecode that is reached, that is, the bytecode position for which the bytecode callback function is invoked.

In step 202, the current system time is retrieved; the elapsed system time is set equal to the current system time minus the last callback invocation system time; and the last callback invocation system time is set equal to the current system time. The elapsed system time is the amount of system time that has elapsed since the system time at which the last breakpoint occurred.

In step 204, the last class name, last method name, last line number and last bytecode position associated with the invocation of the callback function are retrieved.

In step 206, the elapsed system time is added to the accumulated system time for the last class name, last method name, last line number and last bytecode position in the timing list.

In step 208, the current thread CPU time is retrieved. In various embodiments, a call is made to the JVMTI GetCurrentThreadCPUTime interface function to determine how much CPU time that the current thread has accumulated since the last callback function invocation.

In step 210, the current thread CPU time is added to the accumulated CPU time in the timing list for the last class name, last method name, last line number and last bytecode position. In this way, the thread CPU time consumption at the start of a current bytecode breakpoint event is considered to be incurred by the execution of the bytecode associated with, and in various embodiments, one or more bytecodes following, the bytecode position associated with the previous bytecode breakpoint event and prior to the current bytecode breakpoint event.

In step 212, the current class name, current method name, current line number and bytecode position are identified. In various embodiments, the current method name is the name of the Java method being executed when the callback function is invoked. In some embodiments, the line number is identified based on the bytecode position when the callback function is invoked. In some embodiments, any of the current class name, current method name, current line number and bytecode position may be provided to the callback function. In other embodiments at least one of the current class name, current method name, current line number and bytecode position may be retrieved.

In step 214, the count for the current class name, current method name, current line number and current bytecode position in the timing list is incremented by one.

In step 216, the current class name, current method name, current line number and current bytecode position are saved as the last class name, last method name, last line number and last bytecode position.

In step 218, the SampleCount is incremented by one. SampleCount is used to determine whether the desired number of samples are collected.

Step 220 determines whether SampleCount is equal to NumSamples, which may be specified by a user in FIG. 3A. If not, in step 222, the bytecode callback function exits.

In response to step 220 determining that SampleCount is equal to NumSamples, in step 224, the breakpoints are cleared. In various embodiments, the ClearBreakPoint interface function is called for the same locations specified in the SetBreakPoint function to remove the breakpoints.

In step 226, the execution of the Java application program is ended. In step 228, the results are displayed.

In some embodiments, in step 220, an amount of elapsed time since the start of execution of the Java application program is used and is compared to a user specified duration, rather than using a SampleCount.

In various embodiments, the timing list forms a histogram of the CPU time consumption of the bytecodes of the Java method which are executed. In various embodiments, the timing list forms a histogram of the system time consumption of the bytecodes of the Java method which are executed. In some embodiments, the timing list forms a histogram of the number of times that various bytecodes of the Java method, are executed.

Figure 10:
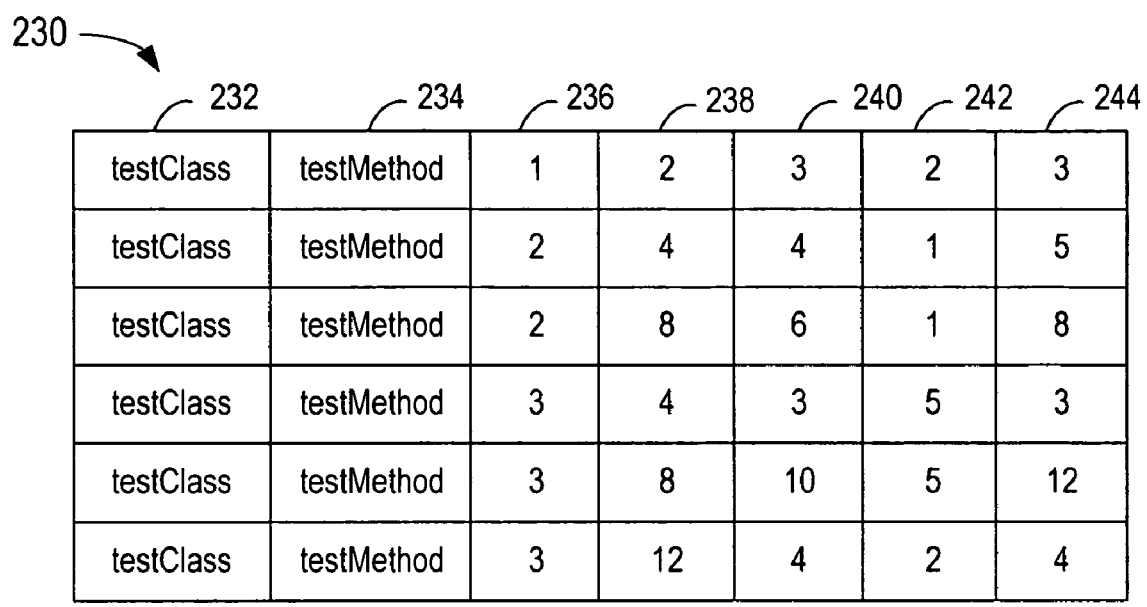
FIG. 10 depicts another exemplary data structure storing illustrative performance data.

FIG. 10 depicts another exemplary timing list 230 which stores illustrative performance data in accordance with the flowchart of FIG. 9. The timing list 230 comprises a class name of testClass 232 and a Java method name of testMethod 234. Column 236 comprises line numbers associated with the bytecode position in column 238. The accumulated CPU time is stored in column 240, the count for the bytecode position is stored in column 242, and the accumulated system time is stored in column 244.

In various embodiments, a user interface is constructed to represent the bytecode information graphically.

Figure 11:
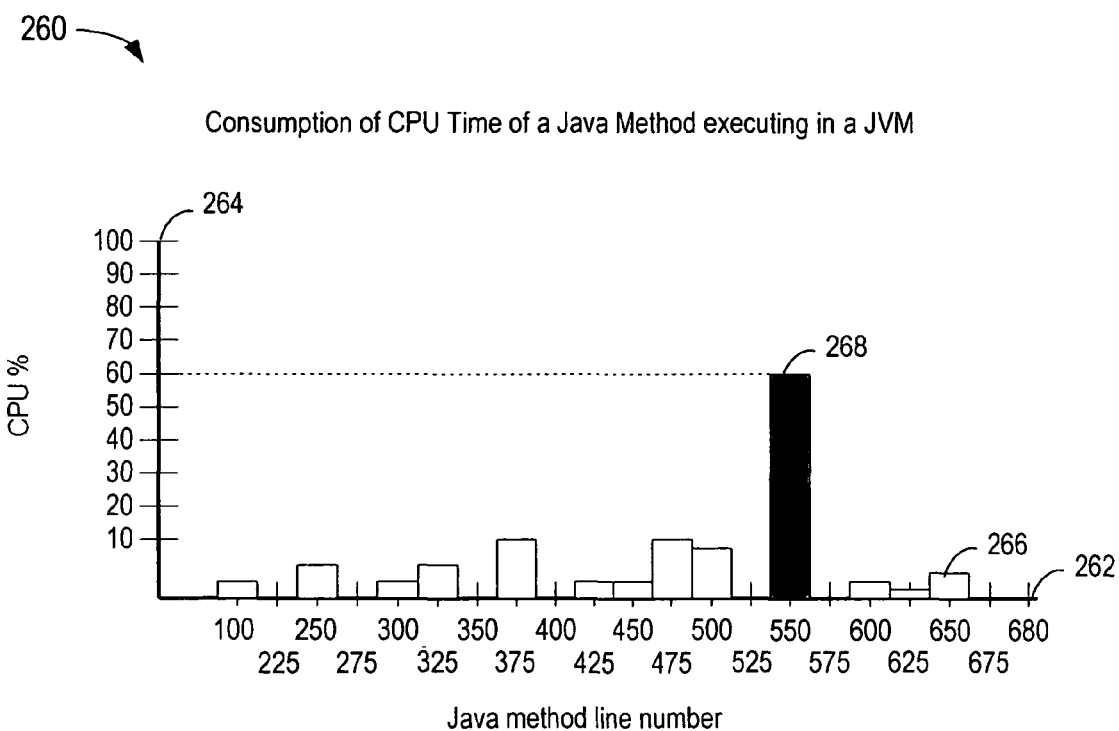
FIG. 11 depicts an illustrative histogram showing the consumption of CPU time by line number of a Java method.

FIG. 11 depicts an illustrative histogram 260 showing the consumption of CPU time by line number of a Java method executing in a JVM. In some embodiments, the histogram of FIG. 11 is displayed by block 118 of FIG. 4. The x-axis 262 shows the Java method line numbers, and the y-axis 264 shows the percentage of CPU time (CPU %) associated with the line numbers of the Java method. A total amount of CPU time by the Java method used is determined by adding all the accumulated CPU times in the timing list for the Java method. The percentage of CPU time for each line number is determined by dividing the accumulated CPU time for a line number by the total amount of CPU time for the Java method and multiplying by 100. A bar 266 shows the percentage of CPU time for each line number. The bar 268 associated with the largest percentage of CPU time has a distinguishing visual indication, in this example, is darker than the other bars.

In another embodiment, the Java method line numbers and associated accumulated CPU time, and in some embodiments, their associated counts, are displayed as text information, rather than a graphically. In some embodiments, the Java method line numbers and associated percentage of CPU time are displayed.

Figure 12:
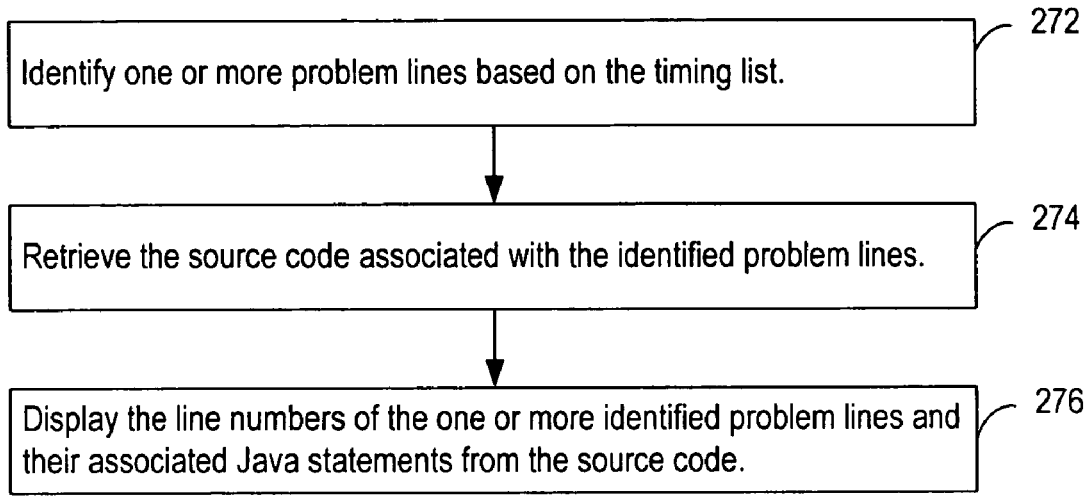
FIG. 12 depicts a flowchart of an embodiment of displaying one or more problem lines in source code.

FIG. 12 depicts a flowchart of an embodiment of displaying one or more problem lines in source code. In some embodiments, the flowchart of FIG. 12 is implemented in step 118 of FIG. 4. In step 272, one or more problem lines are identified based on the timing list. In some embodiments, one or more problem lines are identified based on the accumulated CPU time of the line numbers of the Java method in the timing list. In some embodiments, one or more line numbers having the highest accumulated CPU time(s) are identified as problem lines based on the accumulated CPU time in the timing list. Alternately, a predetermined number of lines which have the highest CPU consumption are identified based on the accumulated CPU time in the timing list. In step 274, the source code associated with the identified problem lines is retrieved. In various embodiments, the Java statements associated with the identified problem lines are retrieved. In step 276, the line numbers of the one or more problem lines and their associated Java statements from the source code are displayed.

In another embodiment, step 272 identifies problem bytecode locations rather than lines. Step 274 identifies the source code associated with the identified problem bytecodes; and, in step 276, the bytecode position of the one or more problem bytecodes, their associated line numbers, and their associated Java statements from the source code are displayed.

Figure 13:
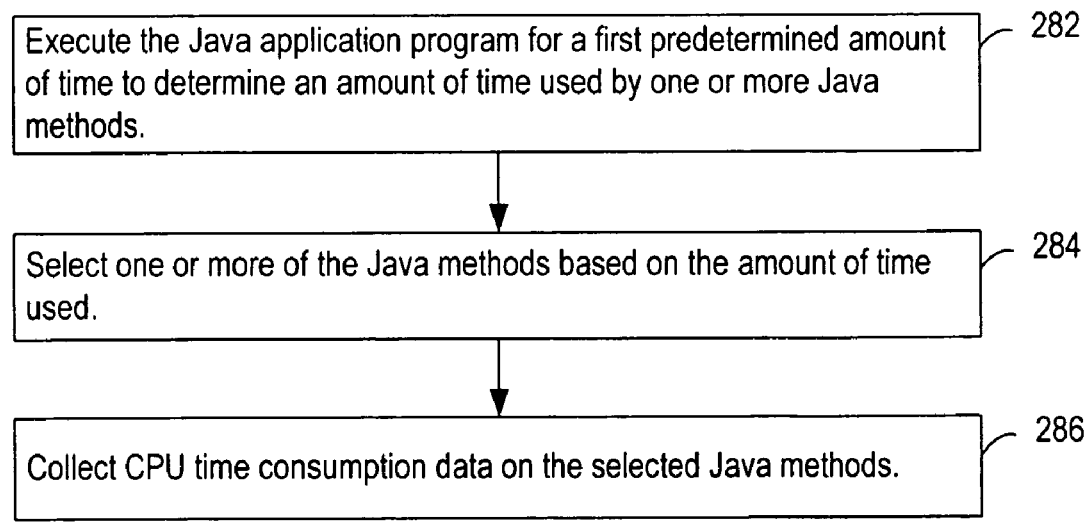
FIG. 13 depicts a flowchart of an embodiment of selecting one or more methods for monitoring.

FIG. 13 depicts a flowchart of an embodiment of selecting one or more Java methods for monitoring. In some embodiments, the flowchart of FIG. 13 is implemented in block 54 of FIG. 3A. In step 282, the Java application program is executed for a first predetermined amount of time to determine an amount of time used by one or more Java methods. In step 284, one or more of the Java methods are selected based on the amount of time used. In some embodiments, the user selects one or more Java methods. In other embodiments, the agent selects one or more Java methods based on the amount of time, system or CPU time, consumed, or alternately, a percentage of time consumed by the Java methods. In some embodiments, the agent selects a predetermined number of Java methods which consume the most time. In other embodiments, the agent selects the most time consuming Java methods which in total use a predetermined percentage of time. In step 286, the agent collects CPU time consumption data on the selected Java methods. In various embodiments, the CPU time consumption data is collected based on the flowchart of FIG. 3, and in some embodiments, the flowchart of FIG. 4, and in other embodiments, the flowchart of FIG. 9.

FIG. 14 depicts a diagram of another embodiment of displaying performance data for various line numbers of a Java method of a Java application program. In various embodiments, the diagram of FIG. 14 is displayed by block 118 of FIG. 4. In this embodiment, the performance data is displayed in a window 290 of a web browser. In the window 290, a portion of the performance data for a Java method called "GetRecordInfo" is shown. The Java statements or bytecode at various monitored line numbers, or alternately, bytecode position at a line number, 292 are shown. The associated line number 294 is also shown. In this example, breakpoints are set for each line number, and the line numbers which are associated with executable Java statements are displayed. The diagram of FIG. 14 is based on the data in the timing list. The accumulated CPU time of a line in the timing list is shown as CPU seconds consumed 296. The accumulated CPU time of the line is determined as described above.

The number of times that the line is invoked (Times Line Invoked) 298, that is, executed, is also shown. The number of times that a line is invoked 298 is the count which is associated with the line in the timing list. The Times Line Invoked 298 for a line is also referred to as the line hit count.

CPU time utilization percentages (CPU %) 300 are also shown. The method CPU time utilization percentage 302 is calculated by dividing the accumulated CPU time for the line in the timing list by the sum of the accumulated CPU times for the lines in the Java method, then multiplying by one hundred. In other words, the method CPU time utilization percentage 302 is equal to the CPU seconds consumed 296 of the line divided by the sum of the CPU seconds consumed 296 for the lines in the Java method, then multiplying by one hundred.

A total CPU time utilization percentage 304 is calculated by dividing the CPU seconds consumed 296 for the line in the timing list by the sum of the CPU seconds consumed for each line in the Java method for all Java methods that have breakpoints set, then multiplying by one hundred. In other words, the total CPU percentage 304 is equal to the CPU seconds consumed 296 for the line divided by the sum of the CPU seconds consumed 296 for each line that has a breakpoint set for all Java methods, that is, the sum of all the CPU seconds consumed 296, then multiplying by one hundred.

The Clock seconds consumed 306 is equal to the accumulated system time for the line in the timing list.

An impact index 308 is also displayed. The impact index is a number that provides a relative indicator of the impact of the line to the Java application. In some embodiments, an impact index of 100 indicates the maximum impact, and an impact index of zero indicates no or negligible impact. In various embodiments, the impact index 308 is calculated as follows.

To calculate the impact index, a weight is associated with each line. The weight is determined based on the line hit count and the method CPU time utilization percentage 302 of the line. For example, a line that has 1,000 hits and 0.3% method CPU time utilization percentage may not be as much of a potential problem as a line that has 5 hits and 3% method CPU time utilization percentage. In another example, the weights have integer values from one to ten. For example, in some embodiments, if the (line hit count<100) and the (method CPU time utilization percentage<0.1) then the line is determined to have a weight of one. In this example which has ten weights, by specifying ten thresholds for hits and CPU time utilization percentages, a weight, from one to ten, is associated with a line. For example, a line (l) is assigned a lowest value of possible weights $w_i$, where i=1 to 10, for those weights $w_i$ for which the ((line hit count (l)<hit threshold (i)) and the (method CPU time utilization percentage (l)<threshold utilization percentage (i))).

The preliminary impact index is calculated by multiplying the Method CPU time for the line by the weight for the line. The Method CPU time is equal to the CPU seconds consumed 296 for the line. The preliminary impact index is calculated for each monitored line of the Java method. As the preliminary impact index is calculated for the lines of the Java method, the highest value of the preliminary impact index is stored.

After the preliminary impact index is calculated for each monitored line of the Java method, the preliminary impact index is normalized to provide the impact index 308. In some embodiments, the normalization is on a scale of 100, where 100 indicates the greatest impact. The preliminary impact index is normalized by multiplying the preliminary impact index for each line by 100 and then dividing by the highest value of the preliminary impact index.

In an alternate embodiment, the weights are based on the Total CPU time utilization percentage 304 for the line, rather than the Method CPU time utilization percentage 302.

In another alternate embodiment, the preliminary impact index is calculated by multiplying the total system or wall clock time for the line by the weight for the line. The total system time for the line is equal to the Clock Seconds consumed 306 for the line. When the wall clock time is used in the calculation of the impact index, any waits for resources and locks, are included in the resulting value of the impact index.

Figure 15:
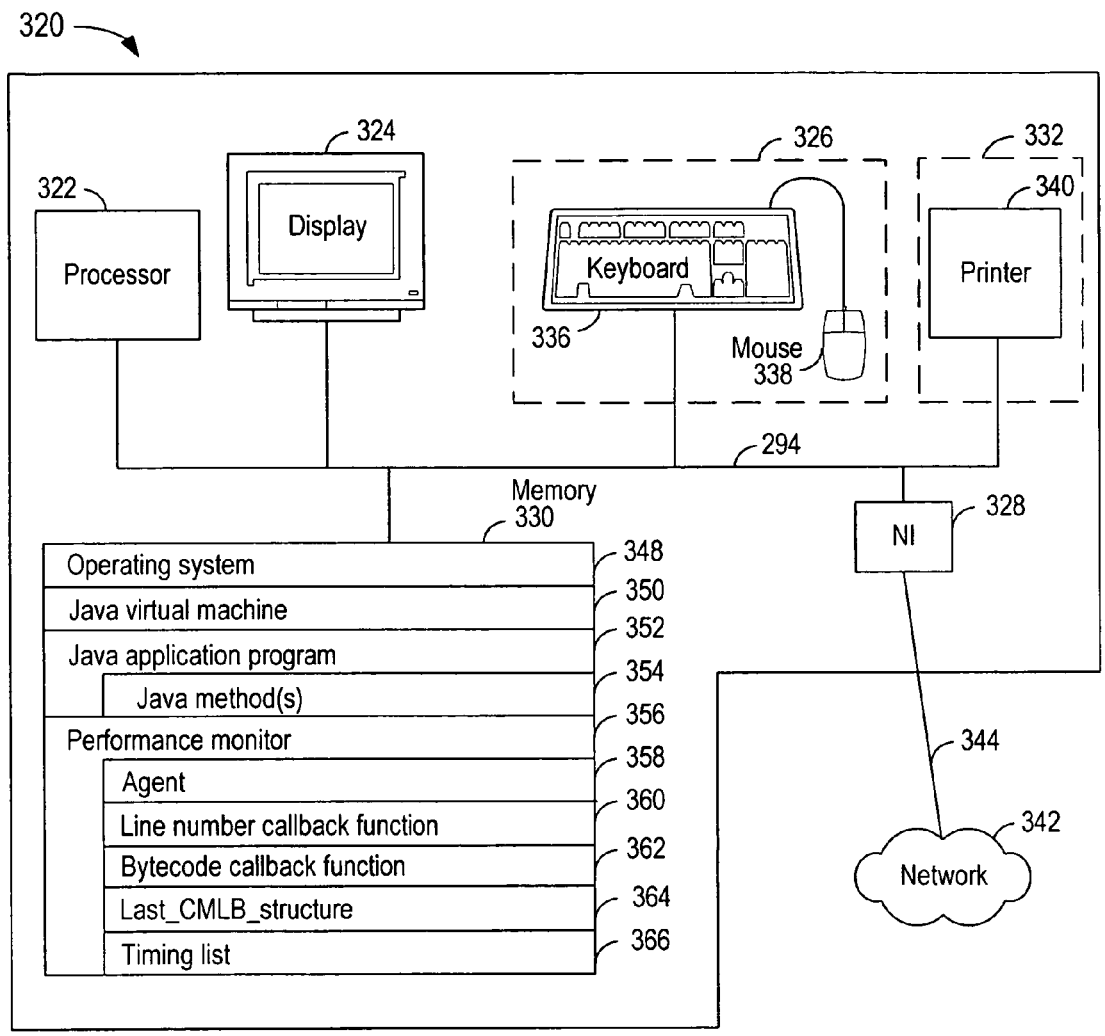
FIG. 15 depicts an illustrative computer system which uses various embodiments of the present invention.

FIG. 15 depicts an illustrative computer system 320 which uses various embodiments of the present invention. The computer system 320 comprises a processor 322, display 324, input interfaces (I/F) 326, communications interface 328, memory 330 and output interface(s) 332, all conventionally coupled, directly or indirectly, by one or more buses 334. The input interfaces 326 comprise at least one of a keyboard 336 and a point device such as a mouse 338. The output interface 332 comprises a printer 340. The communications interface 328 is a network interface (NI) that allows the computer 320 to communicate via a network 342, such as the Internet. The communications interface 328 may be coupled to a transmission medium 344 such as a network transmission line, for example twisted pair, coaxial cable or fiber optic cable. In another embodiment, the communications interface 328 provides a wireless interface, that is, the communications interface 328 uses a wireless transmission medium.

The memory 330 generally comprises different modalities, illustratively volatile memory such as semiconductor memory, such as random access memory (RAM), and persistent or non-volatile memory, such as, disk drives. In some embodiments, the memory comprises local memory which is employed during execution of the program code, bulk storage, and one or more cache memories which provide temporary storage of at least some program code in order to reduce the number of times program code is retrieved from bulk storage during execution. In various embodiments, the memory 330 stores an operating system 348, a Java virtual machine 350, a Java application program 352 comprising one or more Java methods 354, and a performance monitor 356. The performance monitor 356 comprises an agent 358, a line number callback function 360, a bytecode callback function 362, a Last_CMLB_structure 364, and a timing list 366.

In various embodiments, the specific software instructions, data structures and data that implement various embodiments of the present invention are typically incorporated in the performance monitor 356. Generally, an embodiment of the present invention is tangibly embodied in a computer-readable medium, for example, the memory 330 and is comprised of instructions which, when executed by the processor 322, causes the computer system 320 to utilize the present invention. The memory 330 may store the software instructions, data structures and data for any of the operating system 348, the Java virtual machine 350, Java application program 352 and the performance monitor 356, in semiconductor memory, in disk memory, or a combination thereof.

The operating system 348 may be implemented by any conventional operating system such as z/OS, MVS, OS/390, AIX, UNIX, Windows, LINUX, Solaris and HP-UX.

In various embodiments, the present invention may be implemented as a method, apparatus, computer program product or article of manufacture using standard programming and/or engineering techniques to produce software, firmware, hardware, or any combination thereof. Various embodiments of the invention are implemented in software, which includes and is not limited to firmware, resident software and microcode.

Furthermore various embodiments of the invention can take the form of a computer program product accessible from any computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Example of a computer-readable medium comprise a semiconductor or solid state memory, magnetic tape, a removable computer diskette, a random access memory (RAM), a read-only memory (ROM), a rigid magnetic disk and an optical disk. Current examples of optical disks comprise compact disk—read only memory (CD-ROM), compact disk—read/write (CD-R/W) and digital video disk (DVD). The medium also encompasses transmission media, such as the network transmission line and wireless transmission media. In addition, the software in which various embodiments are implemented may be accessible through the transmission medium, for example, from a server over the network. Those skilled in the art will recognize that many modifications may be made to this configuration without departing from the scope of the present invention.

The exemplary computer system illustrated in FIG. 15 is not intended to limit the present invention. Other alternative hardware environments may be used without departing from the scope of the present invention.

Although various embodiments have been described with reference to a Java virtual machine and a Java application program with Java methods, in other embodiments, other virtual machines, application programs and program components may be used. In various embodiments, a program component may be a Java method, another programming language method, a function, a subroutine or a procedure.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

Trademarks

Java and all Java-based trademarks are trademarks of Sun Microsystems, Inc. in the United States, other countries, or both. Solaris® is a registered trademark of Sun Microsystems, Inc. Microsoft and Windows are trademarks of Microsoft Corporation in the United States, other countries or both. UNIX® is a registered trademark of The Open Group in the United States and other countries. HP-UX® is a registered trademark of Hewlett-Packard Development Company, L.P. LINUX® is a registered trademark of Linus Torvalds. IBM, z/OS, MVS, OS/390 and AIX are registered trademarks of International Business Machines Corporation.

What is claimed is:

1. A computer-implemented method of monitoring the performance of a program component executing in a virtual machine, comprising:
   receiving a granularity;
   setting breakpoints associated with position indicators within said program component, said breakpoints being equally spaced among said position indicators in said program component in accordance with said granularity, wherein each $n^{th}$ position indicator is associated with a breakpoint, wherein n is greater than 1;
   in response to reaching one of said breakpoints, determining an amount of time consumed between said one of said breakpoints and a previous breakpoint; and
   accumulating said amount of time associated with said position indicators, wherein said amount of time is associated with a position indicator that is associated with said previous breakpoint.

2. The method of claim 1 further comprising:
   receiving a division; and
   determining that said division specifies that said position indicators are line numbers.

3. The method of claim 1 further comprising:
   receiving a division; and
   determining that said division specifies that said position indicators are bytecode positions.

4. The method of claim 1 wherein said amount of time is central processing unit (CPU) time, further comprising:
   displaying said amount of CPU time with said associated position indicators.

5. The method of claim 1 wherein said amount of time is central processing unit (CPU) time, further comprising:
   determining a line number associated with a maximum amount of CPU time;
   displaying a statement of said program component associated with said line number; and
   displaying a number of times said statement was executed.

6. The method of claim 1 wherein said position indicators are line numbers, further comprising:
   calculating a preliminary impact index of a particular line having a particular line number of said line numbers by multiplying a central processing unit time for said particular line by a weight for said particular line, said weight being based on a line hit count for said particular line and a central processing unit utilization percentage for said particular line, said line hit count being a number of times a statement associated with said particular line is executed; and
   normalizing said preliminary impact index to provide an impact index.

7. A computer program product for monitoring the performance of a program component executing in a virtual machine, said computer program product comprising a computer readable storage medium having computer readable program code embodied therewith, the computer readable program code comprising:
   computer readable program code configured to receive a granularity;
   computer readable program code configured to set breakpoints associated with position indicators within a program component of an application program, said breakpoints being equally spaced among said position indicators in said program component in accordance with said granularity, wherein each $n^{th}$ position indicator is associated with a breakpoint, wherein n is greater than 1;
   computer readable program code configured to, in response to reaching one of said breakpoints while said application program executes in a virtual machine, determine an amount of time consumed between said one of said breakpoints and a previous breakpoint; and
   computer readable program code configured to accumulate said amount of time associated with said position indicators, wherein said amount of time is associated with a position indicator that is associated with said previous breakpoint.

8. The computer program product of claim 7 further comprising:
   computer readable program code configured to receive a division; and
   computer readable program code that determines that said division specifies that said position indicators are line numbers.

9. The computer program product of claim 7 further comprising:
   computer readable program code configured to receive a division; and
   computer readable program code that determines that said division specifies that said position indicators are bytecode positions.

10. The computer program product of claim 7 wherein said amount of time is central processing unit (CPU) time, and further comprising:
    computer readable program code configured to display said amount of CPU time with said associated position indicators.

11. The computer program product of claim 7 wherein said amount of time is central processing unit (CPU) time, and further comprising:
    computer readable program code configured to display said accumulated amount of CPU time associated with said position indicators in a histogram.

12. The computer program product of claim 7 wherein said amount of time is central processing unit (CPU) time, and further comprising:
    computer readable program code configured to determine a line number associated with a maximum amount of CPU time; and
    computer readable program code configured to display a statement of said program component associated with said line number.

13. The computer program product of claim 7 further comprising:
    computer readable program code configured to identify a plurality of program components of said application program;
    computer readable program code configured to determine an amount of time consumed by at least one of said plurality of said program components over a predetermined amount of time; and
    computer readable program code configured to select at least one program component of said plurality of program components based on said amount of time consumed, wherein said breakpoints are associated with position indicators within said selected at least one program component.

14. A computer system to monitor the performance of a program component of an application program executed in a virtual machine, comprising:
processor; and
a memory storing instructions that are executable by said processor to:
receive a granularity;
set breakpoints associated with position indicators in said program component, said breakpoints being equally spaced among said position indicators in said program component in accordance with said granularity, wherein each $n^{th}$ position indicator is associated with a breakpoint, wherein n is greater than 1;
in response to reaching one of said breakpoints, determine an amount of time consumed between said one of said breakpoints and a previous breakpoint; and
accumulate said amount of time associated with said position indicators in said program component, wherein said amount of time is associated with a position indicator that is associated with said previous breakpoint.

15. The computer system of claim 14 said instructions to:
receive a division; and
determine that said division specifies that said position indicators are line numbers.

16. The computer system of claim 14 said instructions to:
receive a division; and
determine that said division specifies that said position indicators are bytecode positions.

17. The computer system of claim 14 wherein said accumulated amount of time is accumulated central processing unit (CPU) time.

18. The computer system of claim 17 further comprising instructions to display said accumulated amount of time associated with said position indicators on a display.

19. The computer system of claim 14 wherein a line number is associated with a maximum amount of time; and
wherein a statement of said program component associated with said line number is displayed on a display.

20. The computer system of claim 14 further comprising instructions to:
identify a plurality of program components of said application program;
determine an amount of time consumed by at least one of said plurality of said program components over a predetermined amount of time; and
select at least one program component of said plurality of program components based on said amount of time consumed.

* * * * *